No. 643,802. Patented Feb. 20, 1900.
D. B. MORISON.
EXPANSION GLAND.
(Application filed Aug. 9, 1899.)
(No Model.)
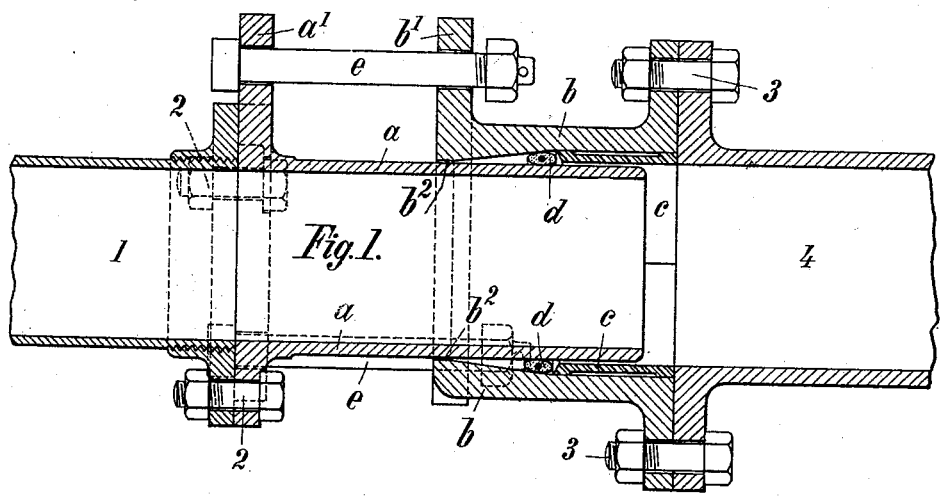
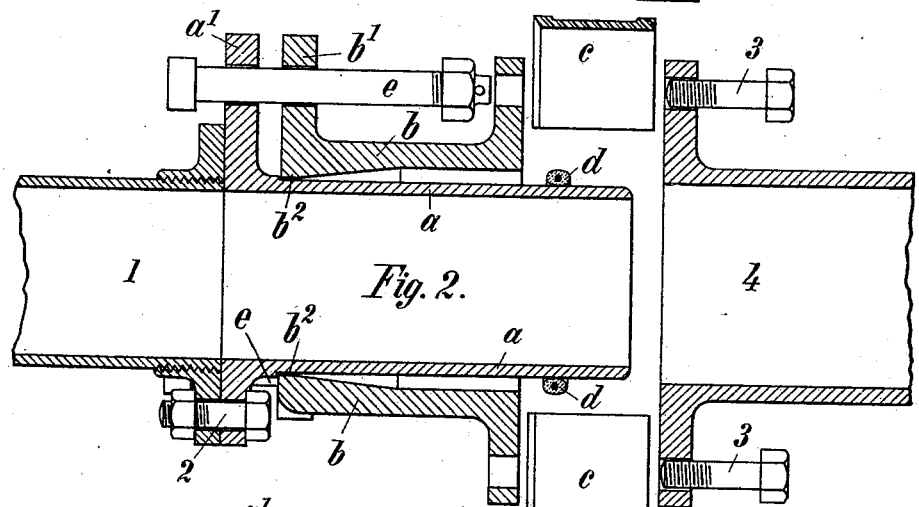
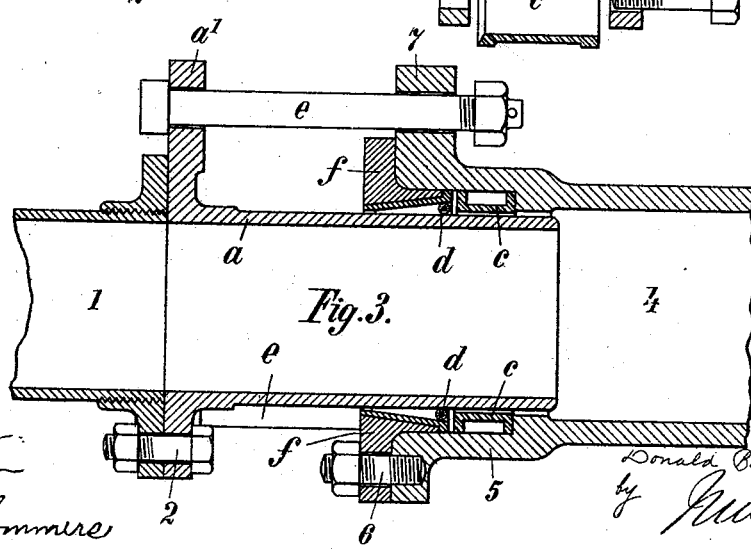

UNITED STATES PATENT OFFICE.

DONALD BARNS MORISON, OF HARTLEPOOL, ENGLAND.

EXPANSION-GLAND.

SPECIFICATION forming part of Letters Patent No. 643,802, dated February 20, 1900.

Application filed August 9, 1899. Serial No. 726,673. (No model.)

*To all whom it may concern:*

Be it known that I, DONALD BARNS MORISON, a subject of the Queen of Great Britain and Ireland, residing at Hartlepool, in the county of Durham, England, have invented new and useful Improvements in Expansion-Glands, of which the following is a specification.

My invention relates to improvements in expansion-glands such as are used for steam-pipes on shipboard; and it consists in improvements whereby the friction of the packing is minimized, the construction simplified, and facilities afforded for longitudinal and lateral movement of the pipes. I attain these objects by the construction and arrangement of the parts illustrated in the accompanying drawings, in which—

Figure 1 is a longitudinal section of the improved expansion-gland as fitted to a range of pipes. Fig. 2 is a similar section showing the joint between the gland and the pipe next it broken and the segments of the neck-bush removed to enable the packing-ring to be examined or a new one fitted. Fig. 3 is a longitudinal section of a modification of the improved expansion-gland.

One arrangement of my invention, which I have illustrated in the drawings, is as follows: The pipe for which longitudinal and lateral movement is required in order to compensate for the varying length or position due to expansion, vibration, or other causes passes through and terminates within a gland $b$, containing the packing by which steam is prevented from escaping to the atmosphere. The end $a$ of the pipe 1, which enters the gland $b$, may be either part of pipe 1 or connected to it by screw-bolts 2 or other method of attachment. Below the end of pipe $a$ the gland is jointed to pipe 4 by screw-bolts 3 or the like. The bore of the gland is conical, the outer end $b^2$ being a free fit for the pipe end $a$, the diameter increasing toward the center. This conical space contains the packing $d$, which on being subjected to the pressure of the steam on its inner side is forced outward toward the apex $b^2$ of the conical space and so prevents the steam from escaping.

Within the gland and extending from the cone-base is a neck-bush in two or more segments $c$, which serves to secure the packing $d$ in place. The pipe $a$ and the gland $b$ may have two or more flanges $a'$ and $b'$, respectively, for holding the ordinary safety-bolts $e$, which retain the pipe end $a$ within the gland $b$, but permit of the necessary longitudinal and lateral movement of the pipe.

In order to examine the packing or fit a new packing-ring, the joint between the gland $b$ and the pipe 4 is broken, the gland pushed back, and the segments of the neck-bush removed, as shown in Fig. 2. Ready access is thus obtained to the interior of the gland $b$ and to the packing-ring $d$, which, if required, may be passed over the end of pipe $a$ and removed.

The packing may be of any suitable material inserted either in a complete ring or jointed, so as to form a ring; but my improved construction consists of a metallic ring forming the core of a fibrous ring, the metallic ring being preferably of such a thickness as would prevent the free escape of steam in the event of the fibrous material wearing away. There may also be one or more rings, either fibrous or metallic, and there may be a metallic spring or springs used in conjunction with the packing ring or rings, which arrangement is well known and therefore not shown in the drawings.

In the modification illustrated by Fig. 3 the end of the pipe 4 is shaped as a faucet and the gland $f$ is jointed to the flanged rim of the faucet 5, by means of screw-bolts 6. In this modified form of expansion-gland the safety-bolts $e$ are held by flanges 7, projecting from the faucet 5 of the pipe 4, and a jointed packing-ring is fitted.

Having fully described my said invention, I declare that what I claim, and desire to secure by Letters Patent, is—

1. The combination with a pipe-terminal, a gland secured thereto the bore of which increases in diameter inwardly from the outer open end of said gland, and a second pipe-terminal, of uniform diameter, somewhat smaller than the least diameter of the bore of the gland and extending into the same; of a packing in the space between the interfitting pipe-section and gland, and means for preventing the separation of said parts without interfering with their reciprocal motion, for the purpose set forth.

2. The combination with two pipe-terminals, of a gland rigidly secured to one of said terminals and fitting loosely onto the other, said gland having a bore tapering outwardly from the pipe-terminal to which it is secured, to form an annular space wedge-shaped in section between the interfitting parts, a rolling packing in said space, and means for preventing the separation of said interfitting parts without interfering with the reciprocal motion thereof, for the purpose set forth.

3. The combination with a pipe-terminal, a gland secured thereto the bore of which increases in diameter inwardly from the open outer end of said gland, and a second pipe-terminal, of uniform diameter, somewhat smaller than the least diameter of the bore of the gland and extending into the same; of a packing in the space between the interfitting pipe-terminal and gland, a retaining device for said packing and means for preventing the separation of the interfitting parts without interfering with their reciprocal motion, for the purpose set forth.

4. The combination with a pipe-terminal, a gland secured thereto the bore of which increases in diameter inwardly from the outer open end of said gland, and a second pipe-terminal of uniform diameter, somewhat smaller than the least diameter of the bore of the gland and extending into the same; of a packing in the space between the interfitting pipe-terminal and gland, means for limiting the displacement of said packing in the direction of the open end of the pipe-terminal within the gland, and means for preventing the separation of the interfitting parts without interfering with their reciprocal motion, for the purpose set forth.

5. The combination with two pipe-terminals, of an expansion-gland rigidly but detachably secured to one of said terminals and fitted to slide freely on the other, said gland having a bore tapering outwardly from the pipe-terminal to which it is secured to form an annular space wedge-shaped in section between the interfitting parts, a packing and a sectional confining-bushing therefor in said space, and means connecting the gland with the pipe-terminal on which it is fitted so as not to interfere with the reciprocal motion of either, for the purpose set forth.

6. The combination with two pipe-terminals, of an expansion-gland secured to one of said terminals and sliding freely on the other, said gland provided with a bore tapering outwardly from the pipe-terminal to which it is secured to form an annular space wedge-shaped in section between the interfitting parts, the inner end of said bore of greater diameter than the internal diameter of said pipe to which the gland is secured, a packing in the aforesaid space, a sectional bushing interposed between the packing and the pipe-terminal, and means for preventing separation of the interfitting parts without interfering with the reciprocal motion thereof, for the purpose set forth.

DONALD BARNS MORISON.

Witnesses:
T. HARRY TILLY,
I. B. STROVER.